US012787076B2

(12) United States Patent
Hart et al.

(10) Patent No.: US 12,787,076 B2

(45) Date of Patent: Nov. 3, 2026

(54) CREATING NEW ACCESS POINT CONNECTIONS PRIOR TO ROAM POINT IN WIRELESS NETWORK

(71) Applicant: Cisco Technology, Inc., San Jose, CA (US)

(72) Inventors: Brian Donald Hart, Sunnyvale, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 18/593,548

(22) Filed: Mar. 1, 2024

(65) Prior Publication Data

US 2024/0306225 A1 Sep. 12, 2024

Related U.S. Application Data

(60) Provisional application No. 63/489,301, filed on Mar. 9, 2023.

(51) Int. Cl.

*H04W 76/11* (2018.01)
*H04W 84/12* (2009.01)

(52) U.S. Cl.

CPC ............ *H04W 76/11* (2018.02); *H04W 84/12* (2013.01)

(58) Field of Classification Search

CPC .............................. H04W 76/11; H04W 84/12

See application file for complete search history.

(56) References Cited

U.S. PATENT DOCUMENTS 7,440,435 B2 10/2008 Lim et al.
8,532,070 B2 * 9/2013 Pandian ............ H04W 36/0016 455/448

(Continued)

FOREIGN PATENT DOCUMENTS

CN 109819487 B 10/2020
EP 2060133 B1 * 2/2017 ........ H04W 36/0016

(Continued)

OTHER PUBLICATIONS

"IEEE Standard for Information technology—Telecommunications and information exchange between systems Local and metropolitan area networks—Specific requirements: Part 11: Wireless LAN Medium Access Control (MAC) and Physical Layer (PHY) Specifications". IEEE Computer Society. Mar. 29, 2012 (2793 pages).

(Continued)

*Primary Examiner* — Eric Nowlin

(74) *Attorney, Agent, or Firm* — Polsinelli P.C.

(57) ABSTRACT

Method, system, and/or computer readable medium for roaming on a Wi-Fi network having a plurality of access points including: determining that a new AP actor provides a station (STA) actor enhanced characteristics as compared to an existing AP actor, wherein the enhanced characteristics include one or more of a stronger connection, lower congestion, and/or increased bandwidth; transferring required state from the existing AP actor to the new AP actor; and transferring at least some of data wherein the at least some data includes one or more of medium access control service data units (MSDUs), aggregated-MSDUs (A-MSDUs), medium access control protocol data units (MPDUs), and/or aggregated-MPDUs from the existing AP actors to the new AP actor.

20 Claims, 7 Drawing Sheets

(56) References Cited

U.S. PATENT DOCUMENTS

| | | | | |
|---|---|---|---|---|
| 10,880,891 | B2 * | 12/2020 | Amini | H04L 43/10 |
| 11,936,473 | B2 * | 3/2024 | Homchaudhuri | H04B 7/024 |
| 12,342,238 | B2 * | 6/2025 | Tadahal | H04W 36/18 |
| 12,395,954 | B2 * | 8/2025 | Monajemi | H04W 74/006 |
| 12,507,166 | B2 * | 12/2025 | Smith | H04W 36/08 |
| 2005/0083887 | A1 | 4/2005 | Lee et al. | |
| 2006/0083201 | A1 * | 4/2006 | He | H04W 36/02 370/331 |
| 2015/0201451 | A1 | 7/2015 | Pazhyannur et al. | |
| 2017/0244732 | A1 * | 8/2017 | Manjunath | H04L 63/1416 |
| 2019/0007947 | A1 * | 1/2019 | Amini | H04L 43/0894 |
| 2020/0120552 | A1 | 4/2020 | Yang et al. | |
| 2022/0022033 | A1 | 1/2022 | Ho et al. | |
| 2022/0337338 | A1 * | 10/2022 | Homchaudhuri | H04B 7/024 |
| 2023/0105571 | A1 * | 4/2023 | Mohamed Kasim | H04W 24/10 370/329 |
| 2023/0239762 | A1 * | 7/2023 | Tadahal | H04W 12/06 370/331 |
| 2024/0040525 | A1 * | 2/2024 | Monajemi | H04W 74/0816 |
| 2024/0334275 | A1 * | 10/2024 | Gundavelli | H04W 36/023 |
| 2024/0373333 | A1 * | 11/2024 | Smith | H04W 36/08 |
| 2025/0310749 | A1 * | 10/2025 | Monajemi | H04W 8/08 |
| 2025/0330822 | A1 * | 10/2025 | Fang | H04W 36/0069 |
| 2025/0374178 | A1 * | 12/2025 | Li | H04W 48/20 |

FOREIGN PATENT DOCUMENTS

| | | | | |
|---|---|---|---|---|
| EP | 4250818 | A1 | 9/2023 | |
| WO | WO-2008076859 | A2 * | 6/2008 | H04W 40/36 |
| WO | WO-2024005814 | A1 * | 1/2024 | H04W 16/14 |
| WO | 2024073265 | A1 | 4/2024 | |

OTHER PUBLICATIONS

"IEEE Standard for Information technology—Telecommunications and information exchange between systems Local and metropolitan area networks—Specific requirements: Part 11: Wireless LAN Medium Access Control (MAC) and Physical Layer (PHY) Specifications". IEEE Computer Society. Dec. 7, 2016 (3534 pages).

"IEEE Standard for Information Technology—Telecommunications and Information Exchange between Systems Local and Metropolitan Area Networks—Specific Requirements: Part 11: Wireless LAN Medium Access Control (MAC) and Physical Layer (PHY) Specifications". IEEE Computer Society. Dec. 3, 2020 (4379 pages).

"IEEE Standard for Information technology—Telecommunications and information exchange between systems—Local and metropolitan area networks—Specific requirements: Part 11: Wireless LAN Medium Access Control (MAC) and Physical Layer (PHY) Specifications: Amendment 2: Fast Basic Service Set (BSS) Transition". IEEE Computer Society. Jul. 15, 2008 (126 pages).

"IEEE P802.11be™/D1.4 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D1.4. Jan. 2022 (787 pages).

"IEEE P802.11be™/D1.5 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D1.5. Mar. 2022 (831 pages).

"IEEE P802.11be™/D1.6 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be™/D1.6. May 2022 (887 pages).

"IEEE P802.11be™/D2.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.0. May 2022 (873 pages).

"IEEE P802.11be™/D2.1.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.1.1. Aug. 2022 (889 pages).

"IEEE P802.11be™/D2.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.1. Jul. 2022 (885 pages).

"IEEE P802.11be™/D2.2 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.2.Oct. 2022 (923 pages).

"IEEE P802.11be™/D2.3 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D2.3. Nov. 2022 (947 pages).

"IEEE P802.11be™/D3.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.0. Jan. 2023 (999 pages).

"IEEE P802.11be™/D3.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.1. Mar. 2023 (1005 pages).

"IEEE P802.11be™/D3.2 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D3.2. May 2023 (1055 pages).

"IEEE P802.11be™/D4.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for

(56) References Cited

OTHER PUBLICATIONS extremely high throughput (EHT)". 802.11 Working Group of the LAN/MAN Standards Committee of the IEEE Computer Society. IEEE P802.11be/D4.0. Jul. 2023 (1031 pages).

"IEEE P802.11be™/D4.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D4.1. Sep. 2023 (1045 pages).

"IEEE P802.11be™/D5.0 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 8: Enhancements for extremely high throughput (EHT)". 802.11 Working Group of the LAN/MAN Standards Committee of the IEEE Computer Society. IEEE P802.11be/D5.0. Nov. 2023 (1045 pages).

"IEEE P802.11be™/D5.01 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 2: Enhancements for extremely high throughput (EHT)". 802.11 Working Group of the LAN/MAN Standards Committee of the IEEE Computer Society. IEEE P802.11be/D5.01. Mar. 2024 (1051 pages).

"IEEE P802.11be™/D5.1 Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 2: Enhancements for extremely high throughput (EHT)". IEEE P802.11be/D5.1. Mar. 2024 (1051 pages).

Hart (Cisco Systems) B., et al., "A Perspective on Proposed Ultra-high Reliability (UHR) Features for Enterprise Use Cases", IEEE-SA Mentor, Piscataway, NJ USA, vol. 802.11 UHR, Sep. 12, 2022, Retrieved from https://mentor.ieee.org/802.11/dcn/22/11-22-1580-00-0uhr-aperspectiveonproposeduhrfeaturesforenterpriseusecases.pptx on Sep. 9, 2022, pp. 1-36, XP068193767, Slide 15.

Hart (Cisco Systems) B., et al., "Roaming Requirements", IEEE-SA Mentor, Piscataway, NJ USA, vol. 802.11 UHR, No. 1, May 15, 2023, Retrieved from https://mentor.ieee.org/802.11/dcn/23/11-23-0324-01-0uhr-roaming-requirements.pptx on May 15, 2023, pp. 1-15, XP068203219, doc.: IEEE 802.11-23/0324r1, Apr. 2023, Slide 7.

International Search Report and Written Opinion for International Application No. PCT/US2024/018411, mailed Jul. 1, 2024, 13 Pages.

* cited by examiner

CREATING NEW ACCESS POINT CONNECTIONS PRIOR TO ROAM POINT IN WIRELESS NETWORK

CROSS-REFERENCE TO RELATED APPLICATION

This application claims benefit of and priority to U.S. Provisional Patent Application No. 63/489,301, filed Mar. 9, 2023, entitled "FEATURES FOR HITLESS ROAMING", the entire contents of which is incorporated herein by reference in its entirety.

BACKGROUND

A wireless local area network (WLAN) may be formed by one or more wireless access points (APs) that provide a shared wireless communication medium for use by multiple clients also referred to as wireless stations (STAs). The basic building block of a WLAN conforming to the Institute of Electrical and Electronics Engineers (IEEE) 802.11 family of standards and amendments thereof is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

The following description is directed to some particular examples for the purposes of describing innovative aspects of this disclosure. However, a person having ordinary skill in the art will readily recognize that the teachings herein may be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards and amendments thereof.

According to at least one example, a method includes: determining that a new AP actor provides a station (STA) actor enhanced characteristics as compared to an existing AP actor, wherein the enhanced characteristics include one or more of a stronger connection, lower congestion, and/or increased bandwidth; transferring required state from the existing AP actor to the new AP actor; and transferring at least some of data wherein the at least some data includes one or more of medium access control service data units (MSDUs), aggregated-MSDUs (A-MSDUs), medium access control protocol data units (MPDUs), and/or aggregated-MPDUs from the existing AP actor to the new AP actor.

A system that includes a storage configured to store data, such as virtual content data, one or more images, etc. and one or more processors (e.g., implemented in circuitry) coupled to the storage and configured to execute instructions of the above described method.

Additionally, a computer readable medium includes instructions using a computer system. The computer system includes a memory (e.g., implemented in circuitry) and a processor (or multiple processors) coupled to the memory. The processor (or processors) is configured to execute the computer readable medium and cause the processor to: determine that a new AP actor provides a station (STA) actor enhanced characteristics as compared to an existing AP actor, wherein the enhanced characteristics include one or more of a stronger connection, lower congestion, and/or increased bandwidth; transfer required state from the existing AP actor to the new AP actor; and transfer at least some of data wherein the at least some data includes one or more of medium access control service data units (MSDUs), aggregated-MSDUs (A-MSDUs), medium access control protocol data units (MPDUs), and/or aggregated-MPDUs from the existing AP actor to the new AP actor.

Figure 1:
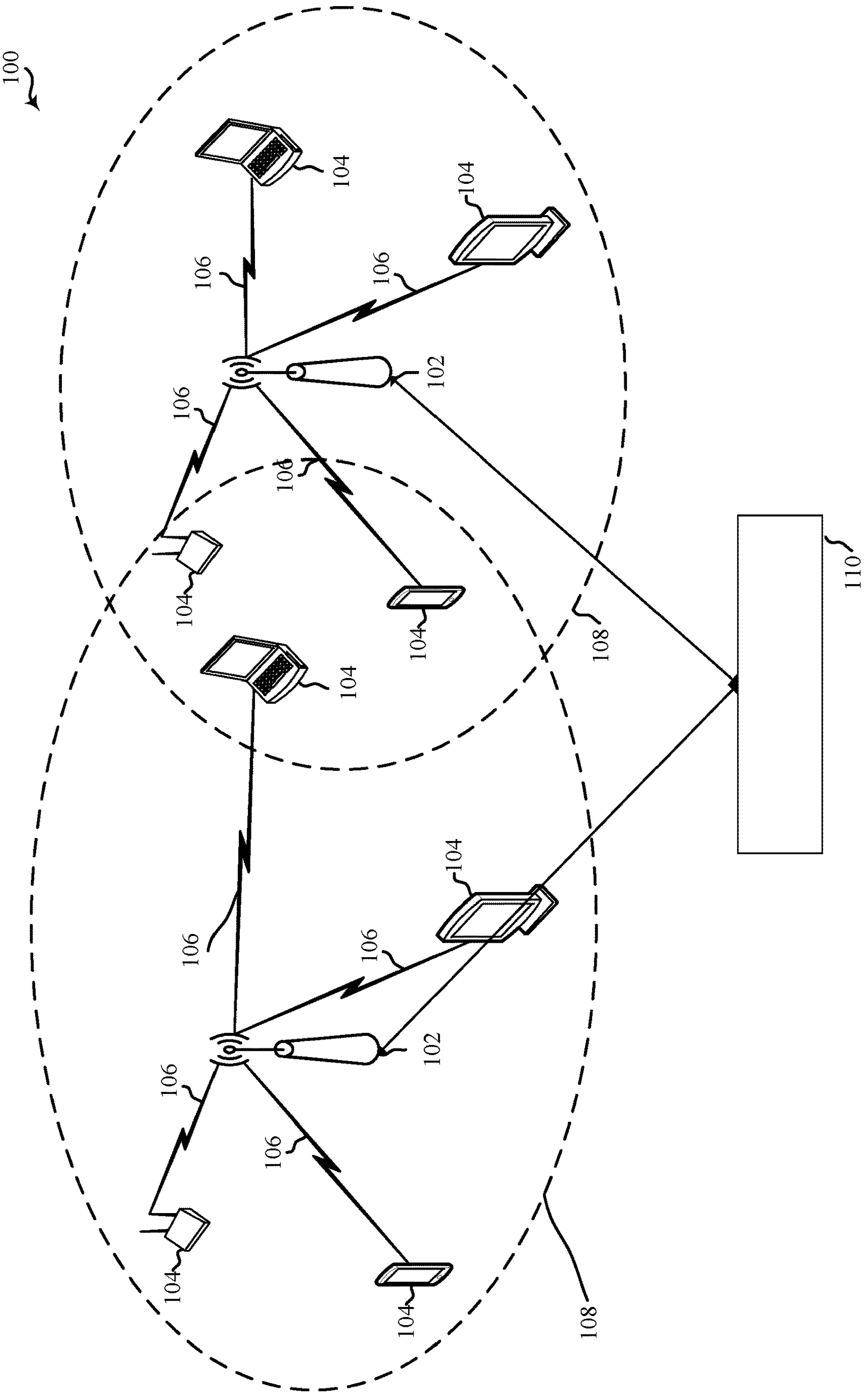
FIG. 1 shows a pictorial diagram of an example wireless communication network according to some aspects of the present technology.

FIG. 1 illustrates a block diagram of an example wireless communication network 100. According to some aspects, the wireless communication network 100 may be an example of a wireless local area network (WLAN) such as a Wi-Fi network (and will hereinafter be referred to as WLAN 100). For example, the WLAN 100 may be a network implementing at least one of the IEEE 802.11 family of wireless communication protocol standards and amendments thereof (such as that defined by the IEEE 802.11-2016 specification or amendments thereof including, but not limited to, 802.11ay, 802.11ax, 802.11az, 802.11ba and 802.11be). Additionally, the WLAN 100 may implement future versions and amendments of the wireless communication protocol standards and amendments thereof such as 802.11bn and be modified according to the present disclosure to include the features contained herein. The WLAN 100 may include numerous wireless communication devices such as an AP actor, which can be one or more of a non-MLD AP, an AP affiliated with an AP MLD, and/or an AP MLD. Additionally, the WLAN can include one or more STA actors 104, which can be one or more of a non-MLD STA, a STA affiliated with a non-AP MLD, and/or a non-AP MLD. As illustrated, the WLAN 100 also may include multiple AP actors 102. The multiple AP actors 102 can be coupled to one another through a switch 110. While the multiple AP actors 102 are shown as being coupled to one another through a switch 110, the network can provide another device that allows the coupling of the multiple AP actors.

Each of the STA actors 104 also may be referred to as a mobile station (MS), a mobile device, a mobile handset, a wireless handset, an access terminal (AT), a user equipment (UE), a subscriber station (SS), client, or a subscriber unit, among other examples. The STA actors 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples. In other examples, the STA actors 104 can be referred to as clients and/or client devices.

A single AP actor 102 and an associated set of STA actors 104 may be referred to as a basic service set (BSS), which is managed by the respective AP 102. FIG. 1 additionally shows an example coverage areas 108 of the associated AP 102, which may represent a basic service area (BSA) of the WLAN 100. As illustrated, three of the STA actors 104 are within the BSA of each of the AP actors 102. The BSS may be identified to users by a service set identifier (SSID), where the BSS might be one of many in the SSID. The BSS may be identified to other devices by a unique (or substantially unique) basic service set identifier (BSSID). The AP 102 periodically broadcasts beacon frames ("beacons") including the BSSID to enable STA actors 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons may include an identification of a primary channel used by the respective AP 102 as well as a timing synchronization function for establishing or maintaining timing synchronization with the AP 102. The AP 102 may provide communication links 106 to the various STA actors 104 and therefore access to external networks. While the example has been described in regards to an AP 102 and STA actors 104, the present disclosure extends such that an AP actor may provide access to external networks to various STA actors in a WLAN via respective communication links 106.

To establish a communication link 106 with an AP 102, each of the STA actors 104 is configured to perform passive or active scanning operations ("scans") on frequency channels in one or more frequency bands (for example, the 2.4 GHZ, 5 GHZ, 6 GHz or 60 GHz bands). To perform passive scanning, a STA actor 104 listens for beacons, which are transmitted by respective AP 102 at or near a periodic time referred to as the target beacon transmission time (TBTT) (measured in time units (TUs) where one TU may be equal to 1024 microseconds (μs)). To perform active scanning, a STA actor 104 generates and sequentially transmits probe requests on each channel to be scanned and listens for probe responses from AP 102. Each STA actor 104 may be configured to identify or select an AP and thence an AP 102 with which to associate based on the scanning information obtained through the passive or active scans, and to perform authentication and association operations to establish a communication link 106 with the selected AP 102. The AP 102 assigns an association identifier (AID) to the STA actor 104 at the culmination of the association operations, which the AP 102 uses to improve the efficiency of certain signaling to the STA actor 104.

The present disclosure modified the WLAN radio and baseband protocols for the PHY and medium access controller (MAC) layers. The AP 102 and STA actors 104 transmit and receive wireless communications (hereinafter also referred to as "Wi-Fi communications") to and from one another in the form of PHY protocol data units (PPDUs). The AP 102 and STA actors 104 also may be configured to communicate over other frequency bands such as shared licensed frequency bands, where multiple operators may have a license to operate in the same or overlapping frequency band or bands.

Each PPDU is a composite structure that includes a PHY preamble and a payload in the form of one or more PHY service data unit (PSDU). The information provided in the preamble may be used by a receiving device to decode the subsequent data in an intended PSDU. In instances in which PPDUs are transmitted over a bonded channel, selected preamble fields may be duplicated and transmitted in each of the multiple component channels.

Figure 2A:
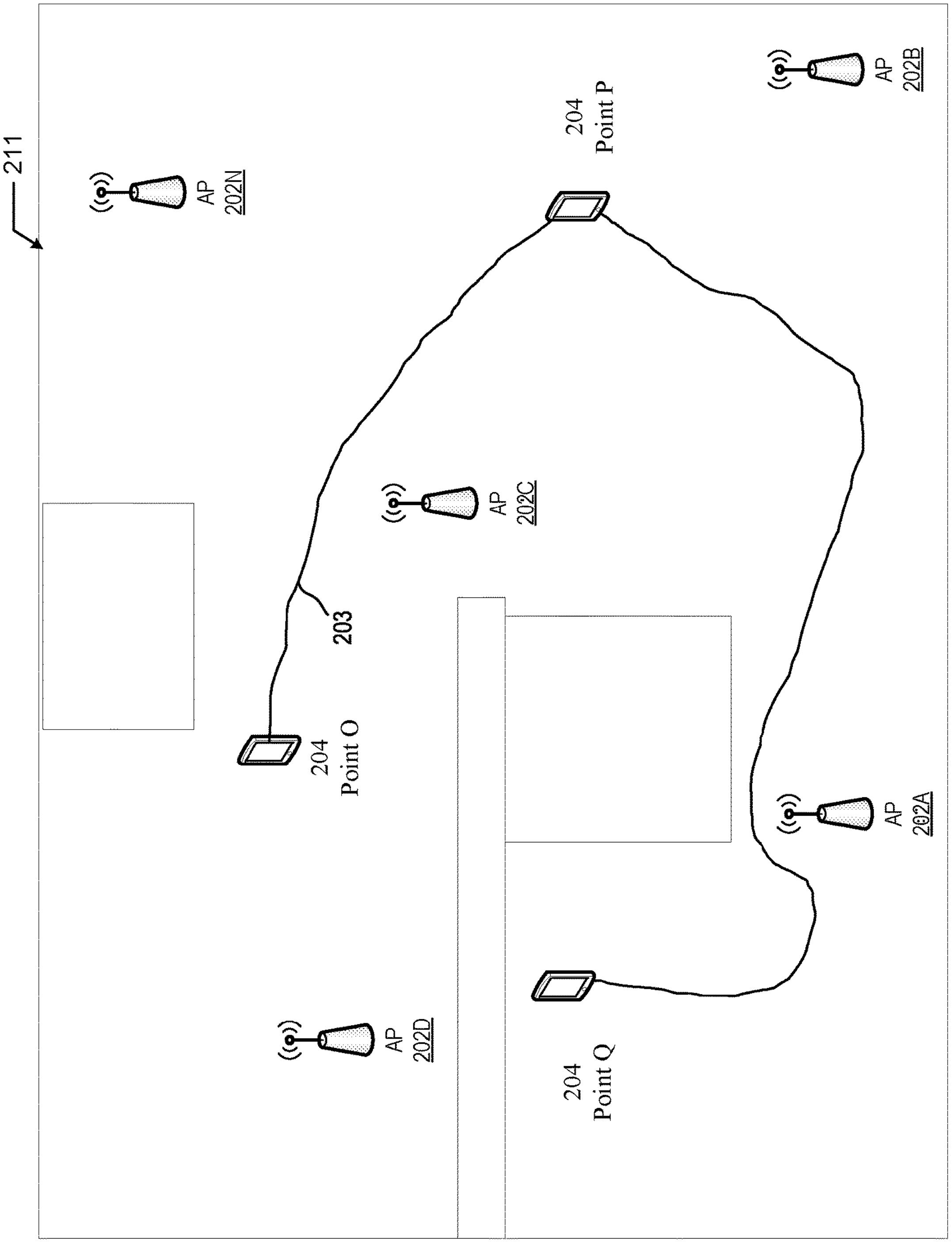
FIG. 2A illustrates an example of a wireless communication network spanning a single floor of a building.

FIG. 2A illustrates an example a single floor 211 of building. While only a single floor is illustrated a description equally applies to multiple floors in a building. Additionally, some of the floors in a building may not be contiguous, such that floors 1, 3, 4, and 8 span a network for a building that has floors 1-10. Thus, in at least one implementation the building can include one or more floors that do not have a network including one or more AP actors. As illustrated, the single floor 211 includes a plurality of AP actors 202A, 202B, 202C, 202D, 202N. Each of the AP actors 202A, 202B, 202C, 202D, 202N can have a respective coverage area such that an overall coverage area can span substantially the entire floor. In other examples, the overall coverage area can extend beyond the entire floor. Additionally, the coverage of one AP actor 202A, 202B, 202C, 202D, 202N may substantially overlap with the coverage of another of the AP actors 202A, 202B, 202C, 202D, 202N.

As illustrated by the line 203, STA actor 204 can move from point O to point P to point Q. When a STA actor 204 is moving around on a given floor, different AP actors 202A, 202B, 202C, 202D, 202N can be considered to be nearest to the STA actor 204. Nearest as used in relation to the AP actors 202A, 202B, 202C, 202D, 202N and STA actor 204 can include being physically nearest (for example, a Euclidean distance on the floor) and/or pathloss-nearest (for example, having the lowest wireless attenuation (pathloss) between AP actor, among all the AP actors, and STA actor). Additionally, the pathloss-nearest approach can be used to reduce the likelihood of connection between an AP actor on a floor above or below the STA actor 204. The location of the AP actor on the floor above or below might be closer in a straight line and/or Euclidean sense, but also not be a desirable AP for the connection of the device or station due to the floor location and/or possible signal interruption.

Figure 2B:
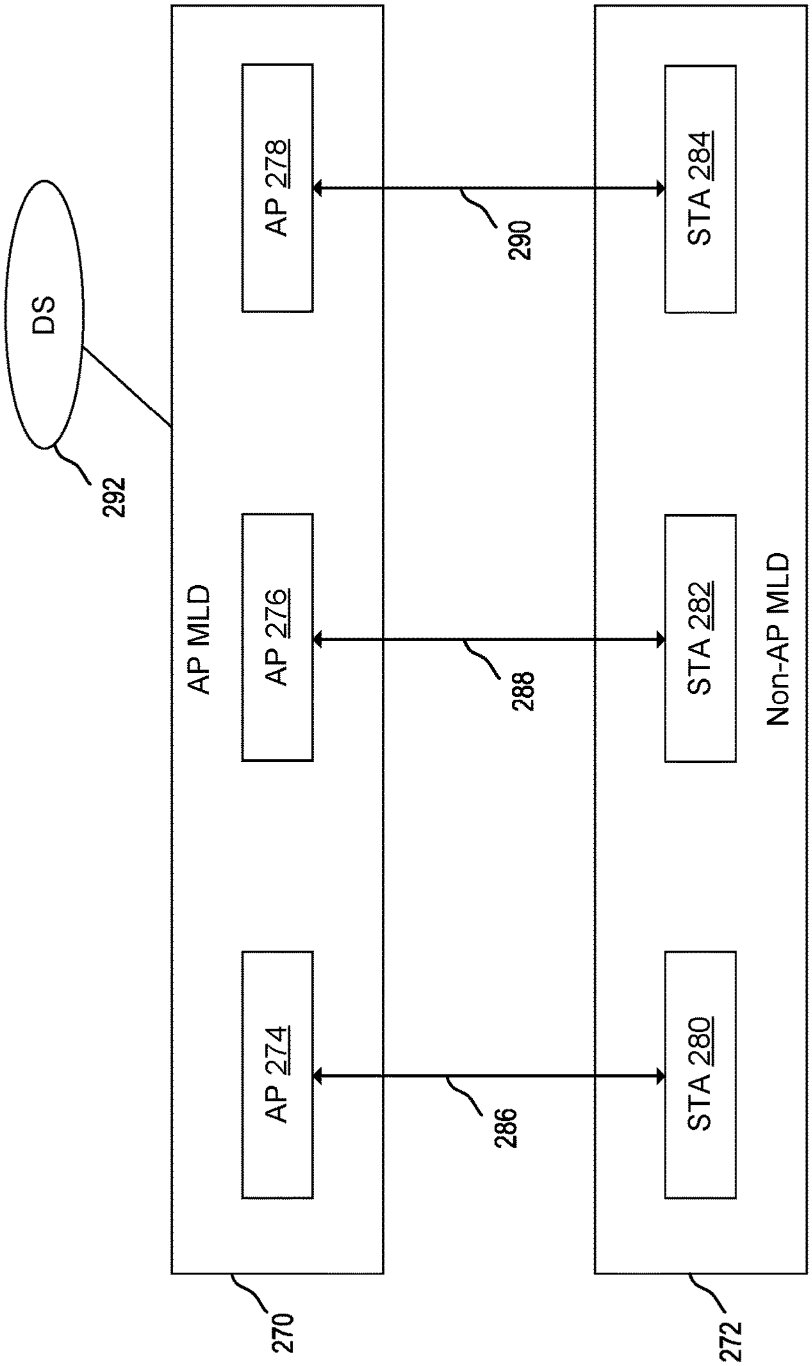
FIG. 2B depicts an illustrative schematic diagram for connectivity of an AP multi-link device (MLD) with multiple affiliated Aps to a non-AP MLD with multiple affiliated non-AP STAs according to some aspects of the present disclosure.

FIG. 2B depicts an illustrative schematic diagram for MLO between an AP MLD with affiliated logical entities and a non-AP MLD with affiliated logical entities according to some aspects of the present disclosure.

Referring to FIG. 2B, two multi-link logical entities AP MLD 270 and Non-AP MLD 272 are shown. AP MLD 270 may include physical and/or logical affiliated APs 274, 276, and 278 operating in different channels and typically different frequency bands (e.g., 2.4 GHz, 5 GHZ, and 6 GHz). Affiliated APs 274, 276, and 278 may be the same as or similar to any one of the APs described above. Non-AP MLD 272 may include STAs 280, 282, and 284, which may be the same as or similar to any of the STAs as described herein.

Affiliated AP 274 may communicate with affiliated STA 280 via link 286. Affiliated AP 276 may communicate with affiliated STA 282 via link 288. Affiliated AP 278 may communicate with affiliated STA 284 via link 290.

AP MLD 270 is shown in FIG. 2B to have access to a distribution system (DS) 292, which is a system used to interconnect a set of BSSs to create an extended service set (ESS).

It should be understood that although the example shows three logical entities within the AP MLD and the three logical entities within the non-AP MLD, this is merely for illustration purposes and that other numbers of logical entities within each of the AP MLD and non-AP MLD may be envisioned. The example Wi-Fi systems and MLO described above with reference to FIGS. 1 and 2A-B provide examples of simplified and example systems of the present disclosure. Additional details of the present disclosure are provided in relation to FIGS. 3A-B. 4, and 5.

Figure 3A:
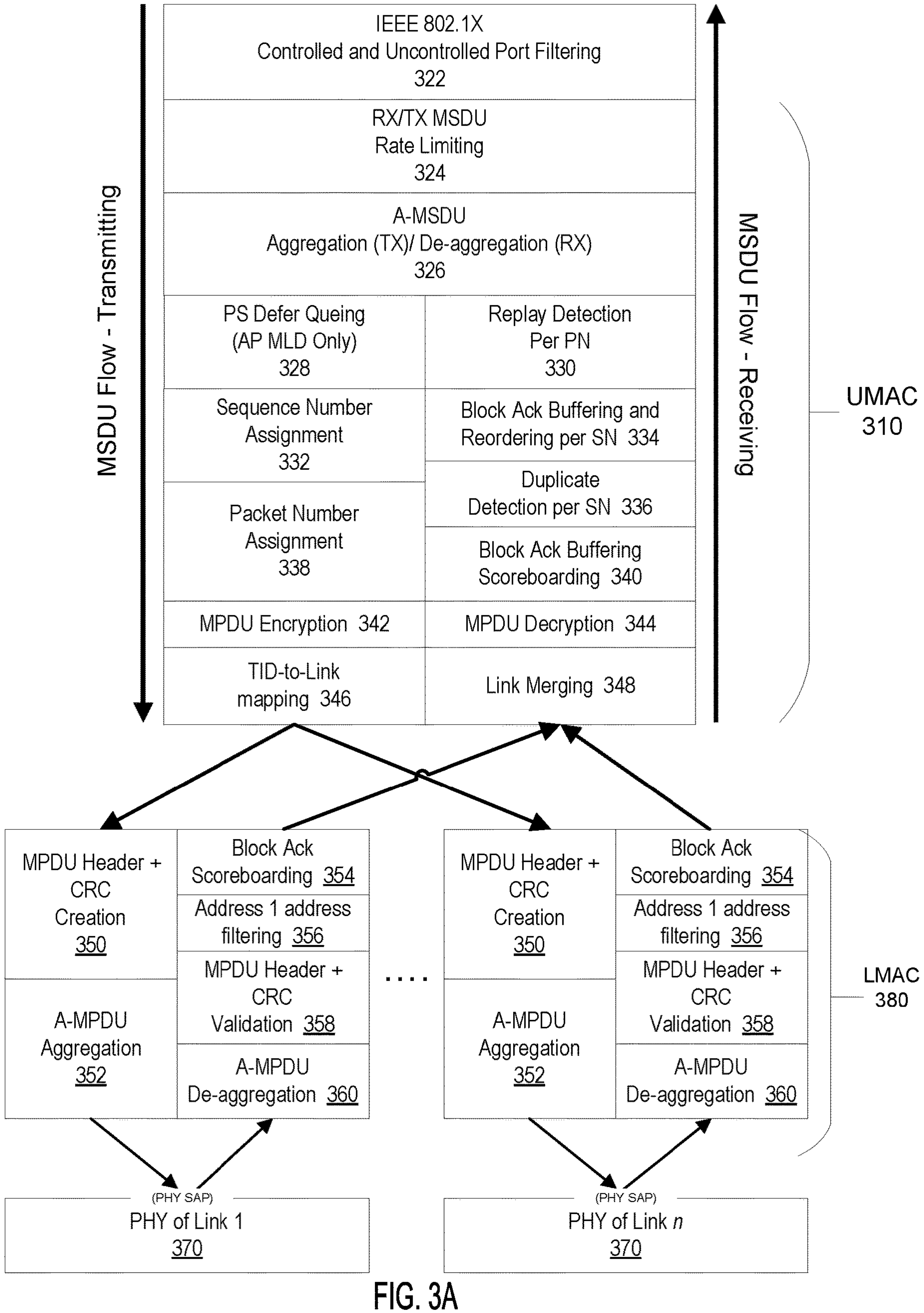
FIG. 3A illustrates an example block diagram of upper medium access control (UMAC), lower MACs (LMACs), and physical layers (PHYs)

FIG. 3A illustrates existing structure for UMAC 310 and LMAC 380 and connectivity to PHY. The UMAC 310 includes a MAC Service Data Unit (MSDU) flow for transmitting and a MSDU flow for receiving. The receiving flow is in the opposite direction of the transmitting. As illustrated, a UMAC 310 includes controlled and uncontrolled port filtering 322. The port filtering 322 may be in accordance with one of the IEEE 802.1X types of standards and amendments thereof as described herein and those that might be agreed upon in the future. As illustrated, the UMAC 310 includes block for receiving/transmitting MSDU rate limited 324. Furthermore, the UMAC 310 includes an aggregate-MSDU (A-MSDU) function, which applies aggregation for transmitting and a de-aggregation for receiving 326. Additionally, in at least one example with AP MLD as described above, a PS defer queuing 328 is included. In at least one example, a replay detection per PN 330 is optionally included. A sequence number assignment 332 may be included as well. A packet number assignment 338 may be included. Additionally, block acknowledgement (Block Ack or BA) buffering and recording 334 may be performed per sequence number. Furthermore, the UMAC 310 may include a duplicate detection per sequence number 336. Still further, the UMAC 310 may include a Block Ack buffering scoreboarding 340 feature. Additionally, the UMAC 310 may include MAC Protocol Data Unit (MPDU) encryption 342 and MPDU decryption 344. Still further, a traffic identifier (TID)-to-Link mapping function 346. Additionally, the UMAC 310 may include link merging 348.

As illustrated, the UMAC 310 communicates with a plurality of LMACs 380, which in turn communicate with corresponding PHYs 370. Each of the LMACs 380 may include a MPDU Header and cyclic redundant check (CRC) creation function 350. Furthermore, the LMACs 380 include an aggregate MPDU (A-MPDU) aggregation function 352. The path through which the data traverses on the way to the PHY 370 includes arriving from the TID-to-Link mapping function 346 of the UMAC 310 and being received by the MPDU header and CRC creation function 350 and the A-MPDU aggregation function 352. Data that is received may likewise by received by the PHY 370 and then proceed through the LMAC 380. The received data from the PHY 370 of one of a number n links pass through the LMAC 380 by going through an A-MPDU an aggregation function 360 and then a MPDU header and CRC validation function 358. The data proceeds to go through address 1 address filtering 356 before being passed through the Block Ack scoreboarding 354, which moves the data to the link merging 348 of the UMAC 310.

Figure 3B:
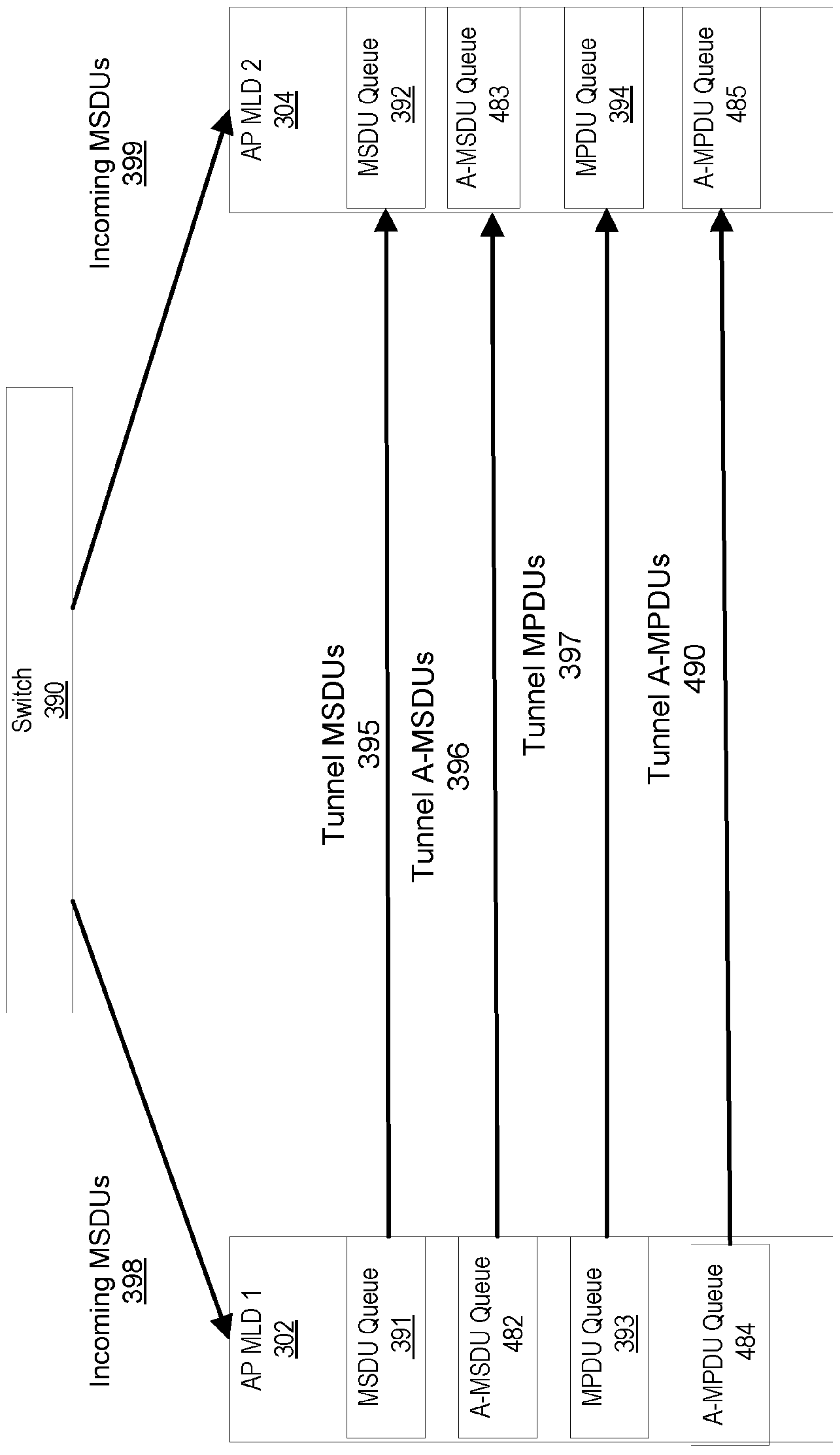
FIG. 3B illustrates an example block diagram of transferring queued media access control service data units from an existing AP MLD to a new AP MLD.

FIG. 3B illustrates an example block diagram of a first AP MLD 302 and a second AP MLD 304, each of which is connected to a switch 390. While a switch 390 is illustrated, other network components can be connected to the AP MLDs 302, 304 and/or provide connectivity between the AP MLDs 302, 304. Additionally, while AP MLDs 302, 304 are illustrated, the present disclosure includes implementation with AP actors as described herein. As illustrated in FIG. 2A, the STA can move around such that roaming between AP MLDs is required. The present disclosure determines that a STA actor has moved in relation to the plurality of AP actors such that that the present disclosure determines that a new AP actor provides a STA actor enhanced characteristics as compared to one or more existing AP actors, wherein the enhanced characteristics include one or more of a stronger connection, lower congestion, and/or increased bandwidth. The change from one or more existing AP actors to a new AP actor can also occur for other reasons including but not limited to STA movement, rate of collisions, rate of retries, and/or congestion. The flow of the MSDUs to the STA actor is through one or more of existing AP actors. As illustrated in FIG. 3B, the one or more existing AP actor is a first AP MLD 302. The first AP MLD 302 receives incoming MSDUs 398 from the switch 390. The incoming MSDUs 398 are placed into an MSDU queue 391. Additionally, as illustrated, additional queues can provided for example, the additional queues can include an A-MSDU queue 482, a MPDU queue 393, and/or an A-MPDU queue 484. While these additional queues are shown, the present disclosure can be implemented with a single one of the MSDU queue 391, an A-MSDU queue 482, a MPDU queue 393, and/or an A-MPDU queue 484. The use of the first AP MLD 302 is used for a simplified discussion, but the number of existing AP MLDs can be greater than one. Only a single AP MLD can transmit data to the STA actor at a time. However, additional AP MLDs can be arranged such that data is ready for a hot standby switch over. As illustrated, the second AP MLD 304 can be ready in hot standby, such that the second AP MLD 304 is ready to receive incoming MSDUs 399. The hot standby mode can be configured such that once the roam point is reached, the MSDUs from the switch 390 to the respective STA actor flow through AP MLD 2 304. In other examples, during and/or shortly after the roam point, the MSDUs can be sent to both AP MLD 1 302 and AP MLD 2 304 for further transmission of data onto the STA actor.

Once a decision is made to change from the first AP MLD 302 to the second AP MLD 304, the present disclosure provides for transferring a MSDU queue 391 so that the data can be transferred effectively. The first AP MLD 302 can also be described as a current anchor AP MLD (CAAM). Thus, all data flows through the first AP MLD 302 to the STA actor. Therefore, the CAAM prevents sending duplicate data and/or having gaps in the data. The data in the MSDU queue 391 is transmitted up until the roam point occurs. The roam from the CAAM to a target anchor AP MLD (TAAM)

can be described as a distribution service access point roam (DSAP-R). As soon as the roam point occurs, the switch 390 can begin sending MSDUs to the second AP MLD 2 304.

In other examples, the second AP MLD 2 204 can await data from the first AP MLD 302 prior to processing any data. In the later case, the data from the respective MSDU queue 391 can be transferred to MSDU queue 392 of the second AP MLD 304. Additionally, in at least one example, where additional queues are provided and data transferred can include an A-MSDU queue 482 to A-MSDU queue 483, MPDU queue 393 to MPDU queue 394, and A-MPDU queue 484 to A-MPDU queue 485.

In order to keep the data organized, the present disclosure can proceed depending on if the data is transferred or the data is awaiting transfer. For example, if the switch sends the incoming MSDUs 399 to the second AP MLD 304, then the MSDUs can be processed but the end data queued until the transfer is made from the first AP MLD 302.

In the example wherein the data is transferred prior to the transmission of the incoming MSDUs 399 to the second AP MLD 304, then one or more tunnels 395, 396, 397, and/or 490 can be established. In at least one example, a single tunnel can be implemented. In other examples, any combination of all tunnels 395, 396, 397, and/or 490 can be implemented. In at least one example, the MSDUs can be stored in an MSDU queue 392 on the second AP MLD 304 prior to and/or after the roam point. The present disclosure allows for the SN and/or PN counter state being received at the second AP MLD 304 from the first AP MLD 302 prior to the transmission of the data from the second AP MLD 304. Additionally the STA can receive SNs up to the roam point and/or SN-BA window and an additional predetermined time through one or more of the first AP MLD 302 and second AP MLD 304. Additionally, in at least one example a sequence number (SN) gap can be provided in the MPDUs, built from the MSDUs, being transmitted by the second AP MLD 304. The SN gap can provide for an expected number of MSDUs for a predetermined amount of time. The predetermined amount of time can be between 1-20 milliseconds. The predetermined amount of time can be adjusted based on prior data flow automatically or the determined amount of time can be set by a network administrator.

Additionally, before and/or at the roam point, one or more tunnels 395, 396, 397, and/or 490 are established between the first AP MLD 302 and the second AP MLD 304. The one or more tunnels 395, 396, 397, and/or 490 can include a first tunnel 395 that provides the data coming into the MSDU queue 391 of the first AP MLD 302 to the second AP MLD 304, which is the TAAM. Thus, the MSDUs that are sent through the first tunnel 395 can be processed and sent along to the A-MSDU queue 483.

Additionally, a second tunnel 396 can be provided for the A-MSDUs. The second tunnel 396 takes the A-MSDU queue 391 of the first AP MLD 302 and transfers the A-MSDUs in the A-MSDU queue 483 to the second AP MLD 304. The insertion of the MSDUs and/or A-MSDUs from either the first tunnel 395 and/or second tunnel 396 can be placed according to the SN gap previously created. Therefore, the interruption is kept to a minimum.

Additionally, one or more MPDU tunnel(s), for example third tunnel 397, can be created to provide for transferring the MPDUs in the MPDU queue 393 of the first AP MLD 302 to the MPDU queue 394 of the second AP MLD 304.

Furthermore, one or more AMPDU tunnel(s), for example fourth tunnel 490, can be created to provide for transferring the A-MPDUs in the A-MPDU queue 484 of the first AP MLD 302 to the A-MPDU queue 485 of the second AP MLD 304.

While FIG. 3B has been described in relation to four separate tunnels 395, 396 397, 490, the present disclosure can be implemented with a single tunnel or any number of tunnels. In at least one example, the first tunnel 395 can be combined with the second tunnel 396. In yet another example, the third tunnel 397 can be combined with the fourth tunnel 490. Additionally, other combinations are possible as well. When the tunnels are combined the respective data is separately identified into substreams and sent through the respective tunnel. The ordering of each of the substreams is preserved, but the ordering of data across substreams is not preserved. Additionally, the present disclosure includes using a traffic ID (TID), for example TIDs 0-7 and/or 8-15 to create the respective queues. Additionally, the present disclosure provides for using ACs and TIDs together or separate. Additionally, the relationship is described in regards to a single STA actor. The present disclosure may be implemented with a plurality of STA actors, but the number of tunnels established may remain constant such that the number of tunnels is on a per existing AP actor (for example, first AP MLD 302) and new AP actor (for example, second AP MLD 304) basis. When a single tunnel carries two or more of MSDUs, A-MSDUs, MPDUs, and/or AMPDUs, the MSDUs, A-MSDUs, MPDUs, and/or AMPDUs are distinctly tagged and/or encapsulated.

Additionally in at least one example, the CAAM can have a TX BA queue prior to a roaming point. The CAAM can attempt to flush the buffers to STA actor prior to the roaming. In at least one example, the CAAM can dynamically define the roam point as a gap in traffic when the TX BA queues and/or RX reorder buffers are low or empty. In yet another example, the present disclosure includes in a predetermined period before the roaming point during which a TX BA and/or RX reorder buffer transfer are implemented. Additionally, the buffer transfer during the predetermined period can be applied to one or more of MSDUs, A-MSDUs, MPDUs, and/or A-MPDUs. implementing a TX BA queue and/or RX reorder buffer transfer from the CAAM to the TAAM.

In at least one example, the TAAM can buffer all UL traffic until the TAAM has received all PN replay state as of the roaming point. Additionally, the TAAM can poll the STA actor using BAR for DL and/or TX BA scoreboard state. Additionally, the TAAM can poll the STA actor using a newly-defined control frame exchange for the UL RX BA scoreboard state and/or RX BA scoreboard state. Still further in at least one example, the TX/RX BA scoreboards can be tunneled from CAAM to TAAM. In yet another example, the present disclosure can select the faster to complete of. In yet another example, if a difference exists then the present disclosure can select the more trusted TX/RX BA scoreboards tunneled from CAAM to TAAM. In another example, the process can be performed for the TX BA scoreboard state only and/or the process can be performed for the RX BA scoreboard state only.

Figure 4:
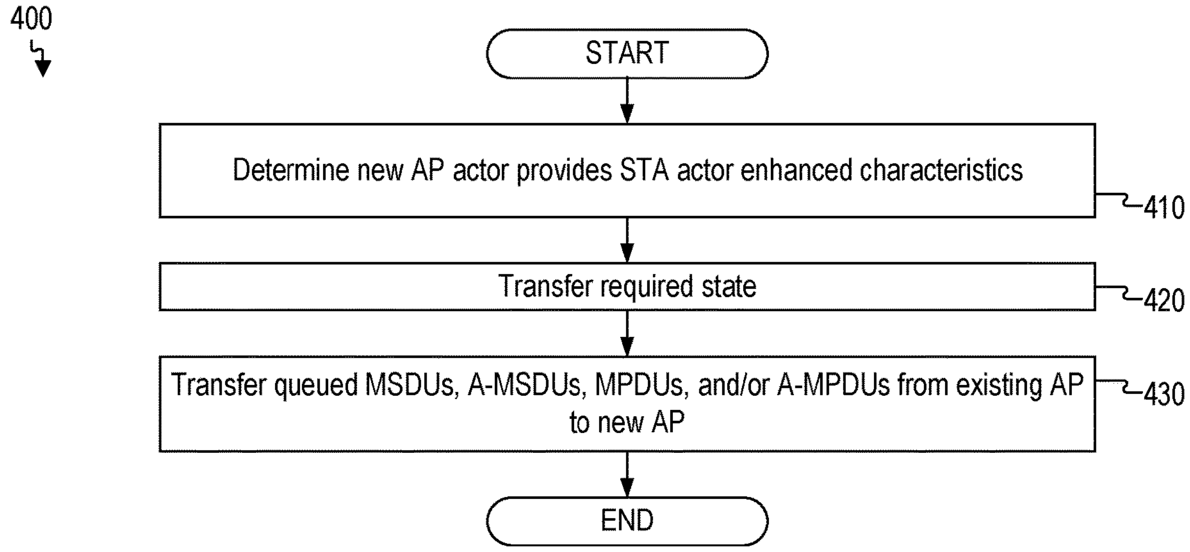
FIG. 4 illustrates an example routine for joint transmission for a wireless connection according to some aspects of the present technology.

FIG. 4 illustrates an example method 400 for roaming on a Wi-Fi network having a plurality of access point actors (AP actors). Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes determining that a new AP actor provides a station (STA) actor enhanced characteristics as compared to an existing AP actor, wherein the enhanced characteristics include one or more of a stronger connection, lower congestion, and/or increased bandwidth at block 410. For example, the AP MLDs 302, 304 illustrated in FIG. 3B can be the existing AP actor and new AP actor respectively.

The method can include transferring required state from the existing AP actor to the new AP actor at block 420. In at least one example, the transferring required state includes transferring all required states.

The method can include transferring at least some of data wherein the at least some data includes one or more of medium access control service data units (MSDUs), aggregated-MSDUs (A-MSDUs), medium access control protocol data units (MPDUs), and/or aggregated-MPDUs from the existing AP actors to the new AP actor at block 430. The transferring the queue of the one or more of MSDUs, A-MSDUs, MPDUs, and/or A-MPDUs occurs before, during, and/or after a roam point.

The method can also include establishing at least one tunnel between the existing AP actor and the new AP actor. The method can also include using a preestablished tunnel between the AP actor and the new AP actor. For example, the tunnels can include one or more of the tunnels 395, 396, 397, and/or 490 as described in relation to FIG. 3B. Additionally, other tunnels can be included as well as mentioned above. The method can also include establishing a queue of incoming MSDUs, A-MSDUs, MPDUs, and/or A-MPDUs at the new AP actor. Examples of the queues are further described in relation to FIG. 3B above.

The method can include establish an additional tunnel to transmit a MPDU queue from the existing AP actor to a new MPDU queue on the new AP actor, wherein the new MPDU queue is initially empty. The method can create a sequence number gap in the MPDU queue to provide a location for extra tunneled MSDUs, A-MSDUs, MPDUs, and/or A-MPDUs arriving from the existing AP actor. The method can disaggregate A-MSDUs prior to transmitting from the existing AP actor to the new AP actor. Additionally, the method can create a sequence number gap in the A-MSDU queue to provide a location for extra tunneled A-MSDUs arriving from the existing AP actor.

Still further, the establishing the at least one tunnel occurs before a roam point. Additionally, a multi-link device (MLD) of the AP actor stops, after the roam point, accepting incoming data. While the term roam point seemingly refers to a specific point in time, the use of roam point is an agreed instant defined between the AP actor(s) and the STA actor. The time over which the roam point occurs can vary depending upon the infrastructure and the time it takes to complete activity.

Figure 5:
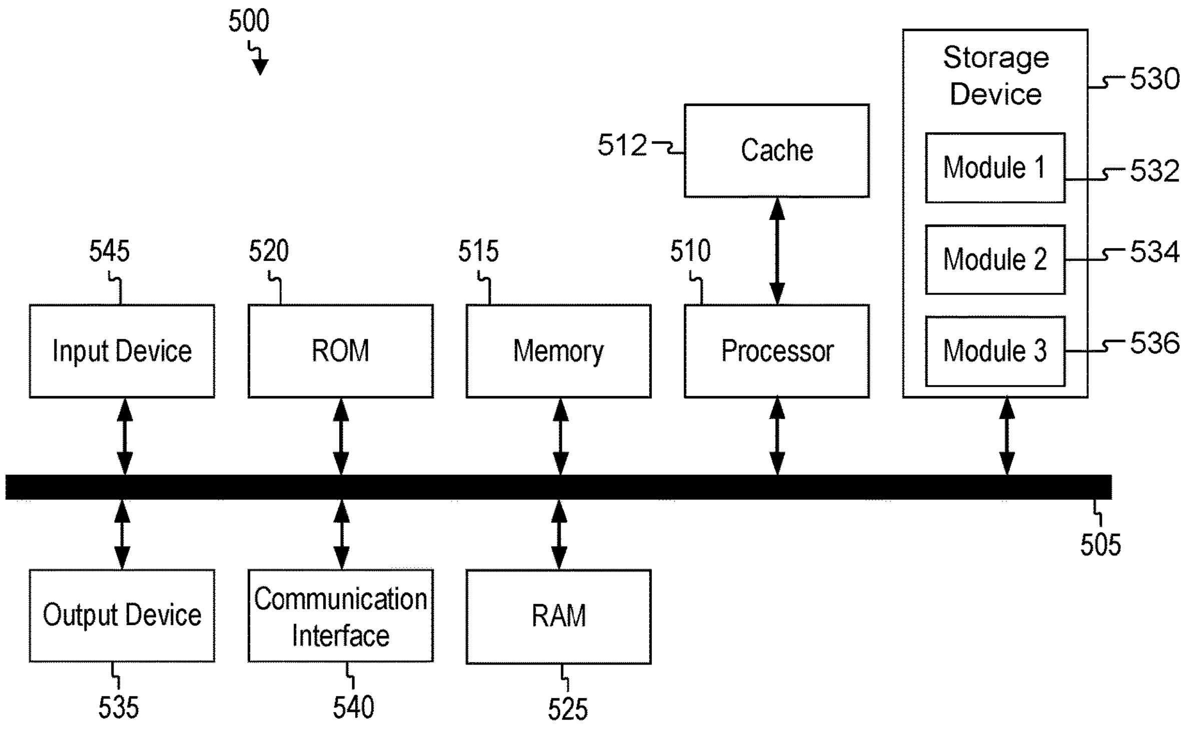
FIG. 5 shows an example of computing system, which may be for example any computing device that may implement components of the system.

FIG. 5 shows an example of computing system 500, which may be for example any computing device making up an AP, STA, or any component thereof in which the components of the system are in communication with each other using connection 505. Connection 505 may be a physical connection via a bus, or a direct connection into processor 510, such as in a chipset architecture. Connection 505 may also be a virtual connection, networked connection, or logical connection.

In some embodiments computing system 500 is a distributed system in which the functions described in this disclosure may be distributed within a datacenter, multiple datacenters, a peer network, etc. In some embodiments, one or more of the described system components represents many such components each performing some or all of the function for which the component is described. In some embodiments, the components may be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 may include a cache of high-speed memory 512 connected directly with, in close proximity to, or integrated as part of processor 510.

Processor 510 may include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which may represent any number of input mechanisms, such as a microphone for speech, a touch-sensitive screen for gesture or graphical input, keyboard, mouse, motion input, speech, etc. Computing system 500 may also include output device 535, which may be one or more of a number of output mechanisms known to those of skill in the art. In some instances, multimodal systems may enable a user to provide multiple types of input/output to communicate with computing system 500. Computing system 500 may include communications interface 540, which may generally govern and manage the user input and system output. There is no restriction on operating on any particular hardware arrangement and therefore the basic features here may easily be substituted for improved hardware or firmware arrangements as they are developed.

Storage device 530 may be a non-volatile memory device and may be a hard disk or other types of computer readable media which may store data that are accessible by a computer, such as magnetic cassettes, flash memory cards, solid state memory devices, digital versatile disks, cartridges, random access memories (RAMs), read only memory (ROM), and/or some combination of these devices.

The storage device 530 may include software services, servers, services, etc., that when the code that defines such software is executed by the processor 510, it causes the system to perform a function. In some embodiments, a hardware service that performs a particular function may include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a STA device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

Aspect 1. A method for roaming on a Wi-Fi network having a plurality of access points, the method comprising: determining that a new AP actor provides a station (STA) actor enhanced characteristics as compared to an existing AP actor, wherein the enhanced characteristics include one or more of a stronger connection, lower congestion, and/or increased bandwidth; transferring required state from the existing AP actor to the new AP actor; and transferring at least some of data wherein the at least some data includes one or more of medium access control service data units (MSDUs), aggregated-MSDUs (A-MSDUs), medium access control protocol data units (MPDUs), and/or aggregated-MPDUs from the existing AP actor to the new AP actor.

Aspect 2. The method of Aspect 1, wherein the transferring required state includes transferring all required states.

Aspect 3. The method of any one of Aspects 1-2, wherein transferring the at least some data includes transferring all queued data, wherein the queued data is one or more of MSDUs, A-MSDUs, MPDUs, and/or A-MPDUs.

Aspect 4. The method of any one of Aspects 1-3, further comprising: establishing at least one tunnel between the existing AP actor and the new AP actor.

Aspect 5. The method of Aspect 4, further comprising: establishing a queue of incoming MSDUs, A-MSDUs, MPDUs, and/or A-MPDUs at the new AP actor.

Aspect 6. The method of Aspect 5, further comprising: establishing an additional tunnel to transmit a MPDU queue from the existing AP actor to a new MPDU queue on the new AP actor, wherein the new MPDU queue is initially empty.

Aspect 7. The method of Aspect 6, further comprising: creating a sequence number gap in the MPDU queue to provide a location for extra tunneled MSDUs, A-MSDUs, MPDUS, and/or A-MPDUs arriving from the existing AP actor.

Aspect 8. The method of Aspect 7, further comprising disaggregating A-MSDUs prior to transmitting from the existing AP actor to the new AP actor.

Aspect 9. The method of any one of Aspects 6-8, wherein the establishing the at least one tunnel occurs before a roam point.

Aspect 10. The method of Aspect 9, wherein a multi-link device (MLD) of the existing AP actor stops, after the roam point, accepting incoming data.

Aspect 11. The method of any one of Aspects 6-10, further comprising: creating a sequence number gap in an A-MSDU queue to provide a location for extra tunneled A-MSDUs arriving from the existing AP actor.

Aspect 12. The method of Aspect 11, further comprising disaggregating the A-MSDUs prior to transferring the A-MSDUs.

Aspect 13. The method of any one of Aspects 1-12, wherein the transferring the one or more of MSDUs, A-MSDUs, MPDUs, and/or A-MPDUs occurs before, during, and/or after a roam point.

Aspect 14. A system comprising: a storage configured to store instructions; a processor configured to execute the instructions and cause the processor to: determine that a new AP actor provides a station (STA) actor enhanced characteristics as compared to an existing AP actor, wherein the enhanced characteristics include one or more of a stronger connection, lower congestion, and/or increased bandwidth; transfer required state from the existing AP actor to the new AP actor; and transfer at least some of data wherein the at least some data includes one or more of medium access control service data units (MSDUs), aggregated-MSDUs (A-MSDUs), medium access control protocol data units (MPDUs), and/or aggregated-MPDUs from the existing AP actor to the new AP actor.

Aspect 15. The system of Aspect 14, wherein the transfer required state includes transferring all required states.

Aspect 16. The system of any one of Aspects 14-15, wherein the transfer of the at least some data includes transferring all queued data, wherein the queued data is one or more of MSDUs, A-MSDUs, MPDUs, and/or A-MPDUs.

Aspect 17. The system of any one of Aspects 14-16, wherein the processor is further configured to execute instructions to: establish at least one tunnel between the existing AP actor and the new AP actor.

Aspect 18. The system of Aspect 17, wherein the processor is further configured to execute instructions to: establish a queue of incoming MSDUs, A-MSDUs, MPDUs, and/or A-MPDUs at the new AP actor.

Aspect 19. The system of Aspect 18, wherein the processor is further configured to execute instructions to: establish an additional tunnel to transmit a MPDU queue from the existing AP actor to a new MPDU queue on the new AP actor, wherein the new MPDU queue is initially empty.

Aspect 20. The system of Aspect 19, further comprising disaggregating A-MSDUs prior to transmitting from the existing AP actor to the new AP actor.

Aspect 21. The system of any one of Aspects 18-20, wherein the establishing the at least one tunnel occurs before a roam point.

Aspect 22. The system of Aspect 21, wherein a multi-link device (MLD) of the existing AP actor stops, after the roam point, accepting incoming data.

Aspect 23. The system of any one of Aspects 18-22, further comprising: creating a sequence number gap in an A-MSDU queue to provide a location for extra tunneled A-MSDUs arriving from the existing AP actor.

Aspect 24. The system of Aspect 23, further comprising disaggregating the A-MSDUs prior to transferring the A-MSDUs.

Aspect 25. The system of any one of Aspects 14-24, wherein the transferring the one or more of MSDUs, A-MSDUs, MPDUs, and/or A-MPDUs occurs before, during, and/or after a roam point.

Aspect 26. A non-transitory computer readable medium comprising instructions, the instructions, when executed by a computing system, cause the computing system to: determine that a new AP actor provides a station (STA) actor enhanced characteristics as compared to an existing AP actor, wherein the enhanced characteristics include one or more of a stronger connection, lower congestion, and/or increased bandwidth; transfer required state from the existing AP actor to the new AP actor; and transfer at least some of data wherein the at least some data includes one or more of medium access control service data units (MSDUs), aggregated-MSDUs (A-MSDUs), medium access control protocol data units (MPDUs), and/or aggregated-MPDUs from the existing AP actor to the new AP actor.

Aspect 27. The system of Aspect 26, wherein the transfer required state includes transferring all required states.

Aspect 28. The system of any one of Aspects 26-27, wherein the transfer of the at least some data includes transferring all queued data, wherein the queued data is one or more of MSDUs, A-MSDUs, MPDUs, and/or A-MPDUs.

Aspect 29. The system of any one of Aspects 26-28, wherein the processor is further configured to execute instructions to: establish at least one tunnel between the existing AP actor and the new AP actor.

Aspect 30. The system of Aspect 29, wherein the processor is further configured to execute instructions to: establish a queue of incoming MSDUs, A-MSDUs, MPDUs, and/or A-MPDUs at the new AP actor.

Aspect 31. The system of Aspect 30, wherein the processor is further configured to execute instructions to: establish an additional tunnel to transmit a MPDU queue from the existing AP actor to a new MPDU queue on the new AP actor, wherein the new MPDU queue is initially empty.

Aspect 32. The system of Aspect 31, further comprising disaggregating A-MSDUs prior to transmitting from the existing AP actor to the new AP actor.

Aspect 33. The system of any one of Aspects 30-32, wherein the establishing the at least one tunnel occurs before a roam point.

Aspect 34. The system of Aspect 33, wherein a multi-link device (MLD) of the existing AP actor stops, after the roam point, accepting incoming data.

Aspect 35. The system of any one of Aspects 30-34, further comprising: creating a sequence number gap in an A-MSDU queue to provide a location for extra tunneled A-MSDUs arriving from the existing AP actor.

Aspect 36. The system of Aspect 35, further comprising disaggregating the A-MSDUs prior to transferring the A-MSDUs.

Aspect 37. The system of any one of Aspects 26-36, wherein the transferring the one or more of MSDUs, A-MSDUs, MPDUs, and/or A-MPDUs occurs before, during, and/or after a roam point.

What is claimed is:

1. A method for roaming on a Wi-Fi network having a plurality of access point actors, the method comprising:

determining that a new access point (AP) actor provides, to a station (STA) actor enhanced characteristics as compared to an existing AP actor, wherein the enhanced characteristics include one or more of a stronger connection, lower congestion, or increased bandwidth;

transferring required state from the existing AP actor to the new AP actor;

establishing, at the new AP actor, a medium access control protocol data unit (MPDU) queue for data associated with the STA actor;

creating a sequence number gap in the MPDU queue to provide a location in the MPDU queue for extra tunneled data arriving from the existing AP actor; and transferring at least some extra tunneled data from the existing AP actor to the new AP actor by receiving, by the new AP actor from the existing AP actor, the at least some extra tunneled data into the location provided by the sequence number gap, wherein the at least some extra tunneled data includes one or more of medium access control service data units (MSDUs), aggregated-MSDUs (A-MSDUs), medium access control protocol data units (MPDUs), or aggregated-MPDUs.

2. The method of claim 1, wherein the transferring required state includes transferring all required states.

3. The method of claim 1, wherein transferring the at least some extra tunneled data includes transferring all queued data, wherein the queued data is one or more of MSDUs, A-MSDUs, MPDUs, or A-MPDUs.

4. The method of claim 1, further comprising establishing at least one tunnel between the existing AP actor and the new AP actor.

5. The method of claim 4, further comprising establishing a queue of incoming MSDUs, A-MSDUs, MPDUs, or A-MPDUs at the new AP actor.

6. The method of claim 5, further comprising establishing an additional tunnel to transmit a MPDU queue from the existing AP actor to a new MPDU queue on the new AP actor, wherein the new MPDU queue is initially empty.

7. The method of claim 1, further comprising disaggregating A-MSDUs prior to transferring the A-MSDUs from the existing AP actor to the new AP actor.

8. The method of claim 6, wherein the establishing the at least one tunnel occurs before a roam point.

9. The method of claim 4, wherein a multi-link device (MLD) of the existing AP actor stops, after the roam point, accepting incoming data.

10. The method of claim 6, further comprising creating a sequence number gap in an A-MSDU queue to provide a location for extra tunneled A-MSDUs arriving from the existing AP actor.

11. The method of claim 10, further comprising disaggregating the A-MSDUs prior to transferring the A-MSDUs.

12. The method of claim 1, wherein transferring the at least some extra tunneled data occurs before, during, or after a roam point.

13. A system comprising:

a storage configured to store instructions; and a processor configured to execute the instructions and cause the processor to:

determine that a new AP actor provides, to a station (STA) actor enhanced characteristics as compared to an existing AP actor, wherein the enhanced characteristics include one or more of a stronger connection, lower congestion, or increased bandwidth;

transfer required state from the existing AP actor to the new AP actor;

establish, at the new AP actor, a medium access control protocol data unit (MPDU) queue for data associated with the STA actor;

create a sequence number gap in the MPDU queue to provide a location in the MPDU queue for extra tunneled data arriving from the existing AP actor; and transfer at least some extra tunneled data from the existing AP actor to the new AP actor by causing the new AP actor to receive, from the existing AP actor, the at least some extra tunneled data into the location provided by the sequence number gap, wherein the at least some extra tunneled data includes one or more of medium access control service data units (MSDUs), aggregated-MSDUs (A-MSDUs), medium access control protocol data units (MPDUs), or aggregated-MPDUs.

14. The system of claim 13, wherein the transfer required state includes transferring all required states.

15. The system of claim 13, wherein the transfer of the at least some extra tunneled data includes transferring all queued data, wherein the queued data is one or more of MSDUs, A-MSDUs, MPDUs, or A-MPDUs.

16. The system of claim 13, wherein the processor is further configured to execute the instructions to establish at least one tunnel between the existing AP actor and the new AP actor.

17. The system of claim 16, wherein the processor is further configured to execute the instructions to establish a queue of incoming MSDUs, A-MSDUs, MPDUs, or A-MPDUs at the new AP actor.

18. The system of claim 17, wherein the processor is further configured to execute the instructions to establish an additional tunnel to transmit a MPDU queue from the existing AP actor to a new MPDU queue on the new AP actor, wherein the new MPDU queue is initially empty.

19. A non-transitory computer readable medium comprising instructions, the instructions, when executed by a computing system, cause the computing system to:

determine that a new AP actor provides, to a station (STA) actor enhanced characteristics as compared to an existing AP actor, wherein the enhanced characteristics include one or more of a stronger connection, lower congestion, or increased bandwidth;

transfer required state from the existing AP actor to the new AP actor; and establish, at the new AP actor, a medium access control protocol data unit (MPDU) queue for data associated with the STA actor;

create a sequence number gap in the MPDU queue to provide a location in the MPDU queue for extra tunneled data arriving from the existing AP actor; and transfer at least some extra tunneled data from the existing AP actor to the new AP actor by causing the new AP actor to receive, from the existing AP actor, the at least some extra tunneled data into the location provided by the sequence number gap, wherein the at least some extra tunneled data includes one or more of medium access control service data units (MSDUs), aggregated-MSDUs (A-MSDUs), medium access control protocol data units (MPDUs), or aggregated-MPDUs.

20. The non-transitory computer readable medium of claim 19, wherein the transfer required state includes transferring all required states.

* * * * *